Feb. 2, 1943. M. L. DEVOL ET AL 2,309,831
METHOD AND APPARATUS FOR SURFACING GLASS
Filed March 11, 1941
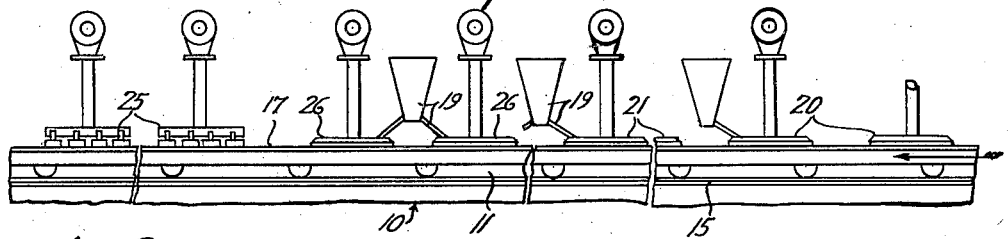
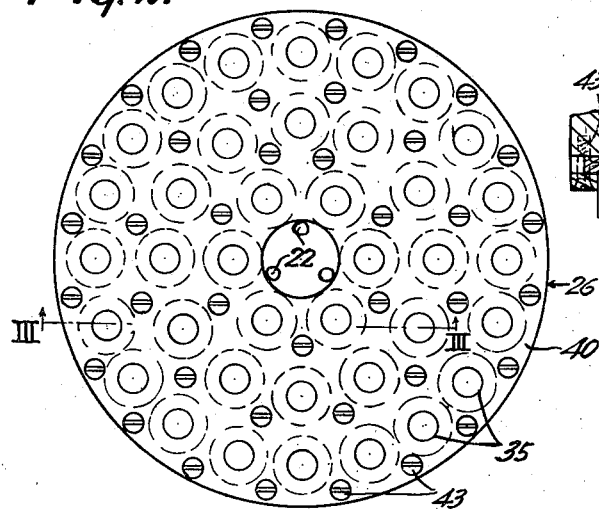
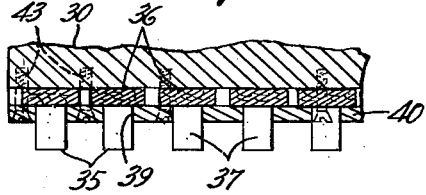
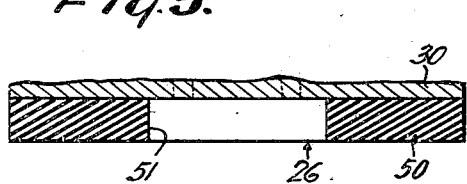
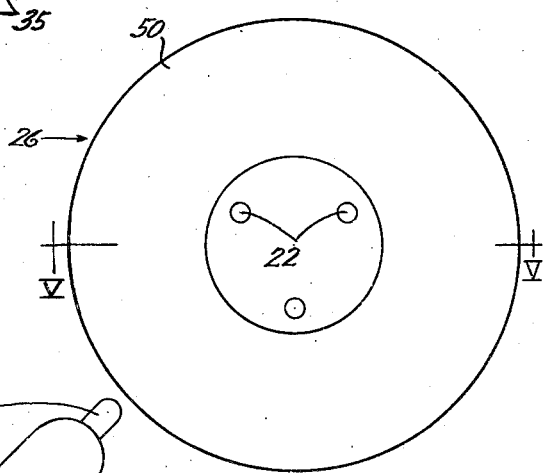
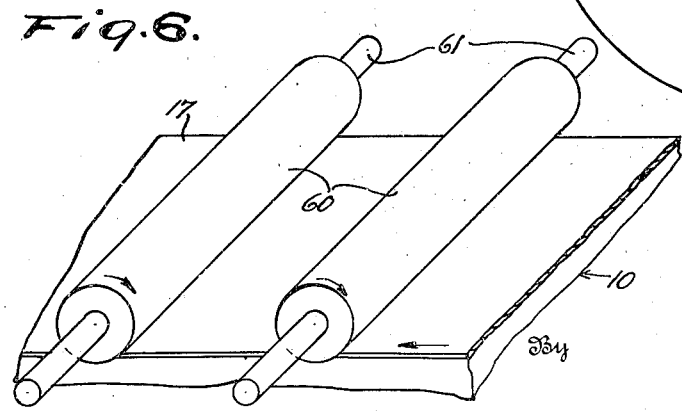
Inventors
MANSON L. DEVOL
PHILIP W. CRIST and
ETHMER J. HAZEN
By Olen E. Bee
Attorney Patented Feb. 2, 1943

2,309,831

UNITED STATES PATENT OFFICE 2,309,831

METHOD AND APPARATUS FOR SURFACING GLASS

Manson L. Devol, Wilkinsburg, Philip W. Crist, Pittsburgh, and Ethmer J. Hazen, Ford City, Pa., assignors to Pittsburgh Plate Glass Company, a corporation of Pennsylvania Application March 11, 1941, Serial No. 382,714

5 Claims. (Cl. 51—283)

This invention relates to the surfacing of plate glass and it has particular relation to methods of and apparatus for minimizing and improving the operations required in grinding and polishing glass surfaces.

One object of the invention is to provide successive steps of surfacing plate glass wherein a number of conventionally employed grinders and polishers can be omitted and replaced by a reduced amount of equipment and power without jeopardizing the quality or speed in producing finished plate glass.

Another object of the invention is to provide an improved method of surfacing plate glass, wherein surfaces of inherently yieldable material are operated in coordination with conventional grinding and polishing operations.

Another object of the invention is to provide an improved type of composition grinding runner composed primarily of resilient or yieldable material for frictionally engaging glass surfaces.

Another object of the invention is to provide an improved plate glass surface texture, or so-called "smooth" preparatory to the application of final polishing runners thereon.

Another object of the invention is to provide an improved grinding and polishing apparatus designed to reduce the amount of mechanism required in surfacing plate glass and further to reduce the amount of power required in operating it.

In the preparation of plate glass having finely polished surface texture, a number of expansive operations have heretofore been necessary including successive grinding operations performed by frictional action of loose abrasive, such as sand, under pressure of rotating metal runners. The sand is carried in a vehicle of water. Successive runners operate with sand of decreasing particle size as the glass is transported along a horizontal path beneath the runners. The sand particles are not absolute in size, but ordinarily the average particle size at the beginning of the grinding operation is approximately 30 mesh. As the sand is progressively ground further down the surfacing line, it becomes finer and finer until at the completion of the grinding operation, it is so small as to be substantially in powdered form approximating 320 to 700 mesh. Then the glass is subjected to another series of metal runners under which fine emery particles are employed as a smoothing agent. After being subjected to the frictional action of the emery under the latter runners, the glass surface texture is known as "smooth." According to conventional practice, the smoothing of the glass immediately precedes the operation of a series of felt runners which are supplied with a polishing agent, such as rouge, applied at the points of frictional contact between the glass and felt. The smoothing operation is considered to be important because it prepares the glass for the final polishing operation and the extent of polishing, as well as the quality of the finished glass, is dependent largely thereon. Since approximately 38 grinding units and 60 polishing units are employed for surfacing plate glass by known methods, it is apparent that a great deal of power and machinery are required for manufacturing finished plate glass products.

It is proposed by the practice of this invention to decrease the number of surfacing runners as compared with the number employed in conventional practice, and in the reduction of the number of runners, a corresponding saving in power consumption is available. On the other hand the time required for polishing can be reduced without changing the number of polishing runners by incorporation in the surfacing line a type of runner which cooperates with other grinding runners in such manner as to provide for increase in speed of operation.

The invention is not limited to the reduction of the number of polishing runners, but substitutions may be made for other types of runners as well. One of the principal features involves the preparation of the plate glass so as to make it more readily responsive to the felt polishing operations. One per cent to fifty per cent of the felt polishers may be replaced by only a relatively few rubber composition runners. For example, one rubber runner unit may be substituted for two to four felt polishing units. Thus by suitable adjustment of the number of polishing runners employed the speed of production can be increased, quality of glass can be improved and savings in power, felt and rouge may be accomplished. Each of these phases is subject to economic factors in time required to complete the process. Up to the extent of fifty per cent of conventional runners which will yield corresponding saving in power consumption, alternatively time required for polishing can be reduced without changing the number of polishing runners, by an equivalent amount instead of removal of polishing runners.

In one form of improved grinding runner, compositions of yieldable material, such as rubber, rubber and fiber, or distinct parts of each material, are employed and are to be installed in the surfacing line between the group of metal runners and the group of felt polishing runners. It is possible that the emery runners may be altogether dispensed with, or that the yieldable runners should immediately follow the emery runners in the surfacing line. The surfacing faces of the yieldable runner can be in the form of a cupped rubber unit having a rim of sufficient width to provide suitable surfacing area and supported upon a backing in the form of a rotatable driven metallic head. The manner of driving the surfacing runners is well known in the art. The rubber can also be in the form of a rotatably driven cylindrical member.

On the other hand, a metallic runner head can be employed to support a plurality of yieldable surfacing elements distributed over the bottom area thereof and secured thereto by suitable fastening means. A central passage in the head support is employed to receive a mixture of abrasive particles and water which, in their frictional action under pressure of the rubber faces, operate to smooth the glass surface. The type of runner described can be arranged in groups of two or more mounted for rotation about a vertical axis in connection with a rotatably driven trunk and each runner can be driven individually.

As a result of surfacing the glass by using relatively coarse sand under pressure of rubber runners preparatory to the polishing action, the surface texture of the smooth produced is characterized by a definite pattern of intersecting striations which under high magnification (such as shown in a photomicrograph) appear to be sparsely distributed and sweeping in one general direction.

This surface is definitely reflective. The texture of conventional smooth, on the other hand, resembles a stippled pattern and the indentations are materially deeper than those of the stratified texture. It is gray in color and non-reflective. The sparsely distributed striations, visible in photomicrographs and as compared with the texture of conventional smooth, indicate that much less polishing is necessary to produce the finished plate glass.

In the drawing:

Fig. 1 is a diagrammatic fragmentary side elevation of a plate glass surface system; Fig. 2 is a fragmentary plan of a glass surfacing runner unit; Fig. 3 is a fragmentary cross section taken substantially along the line III—III of Fig. 2; Fig. 4 is a plan of another form of surfacing runner unit; Fig. 5 is a fragmentary cross section taken substantially along the line IV—IV of Fig. 4; and Fig. 6 is a diagrammatic perspective of a cylindrical surfacing runner having a resilient or yieldable surface.

In practicing the invention, the glass grinding and polishing system 10 in which the features of the invention are incorporated includes glass-carrying cars 11 driven along a horizontal track 15, and upon which plate glass 17 to be surfaced is positioned in a conventional manner. Grinding runners 20 driven about vertical axes frictionally engage the glass surface in conjunction with a mixture of water and abrasive particles, such as sand, which is supplied through distributors 19 along the area of contact of the runners with the glass during the first phases of the surfacing operation. As the glass passes underneath the runners 20, the particle size of the wet abrasive material is gradually decreased as a result of the progressive grinding at successive runners until the glass reaches a series of emery runners 21, each of which may have one or more runner blocks supplied with a mixture of loose emery particles and water conducted centrally through openings 22 therein and upon the glass. The operation of the emery runners in previously-known types of apparatus prepares the glass for frictionally receiving a series of felt polishing runners 25.

In the improved system described herein, and adjacent the location of the emery runners, other runner units 26, which include yieldable composition, are installed and the number of surfacing runners can be reduced or replaced by the runners having the yieldable surfacing faces. Particularly a relatively smaller number of felt runners can be employed than that previously required.

After the passage of the glass under the polishing runners and after it emerges from the end of the surfacing line 10, the glass will have been completely polished on one side and the operations are repeated for likewise surfacing the other side of the glass which is turned over and again transported through the system. The mechanical operation of the surfacing runners is similar to that shown in United States Patent No. 1,724,704.

In one form of yieldable runner block construction, steel or other metal backing 30 is adapted to be secured to the driven portion of the unit and a series of yieldable blocks 35, each of which includes composition of rubber and fiber constituting its head 36 and a body or shank 37, are designed for frictionally engaging the glass surface. The shanks project through openings 39 in a steel plate 40 and the fiber-containing heads 36 are clamped under considerable pressure between the steel backing 30 and plate 40 by means of bolts 43 or other suitable fastening elements which are disposed through the plate 40 and are screw-threaded into the backing. These yieldable and resilient elements 35 are distributed over the surface of the runner and can be collectively or individually removed or replaced.

In another form of runner 26, a rubber block 50 is secured by bonding, cementing, or otherwise, to the lower face of the metal runner head 30 and the surfacing face of the rubber is annular in form. Wet abrasive is fed in the conventional manner to the inner space defined by the annular contour through the passages 22 formed in the metal head 30. The softness of the rubber compensates for inequalities in particle size of the sand or other loose abrasive. It may also be desirable to have predetermined depth of the rubber face of a softer texture than the body of the rubber. By treating this face with a hydrocarbon, such as toluene, benzene, or light lubricating oil, the edge under which the abrasive particles must pass is reduced to such softness as to receive the larger abrasive particles under pressure and frictional action without scratching the glass.

Advantages are also found in employing cylindrical grinding runners 60 in the form of rolls such as those shown in Fig. 6. These runners include driven shafts 61 and the body of each runner is composed of relatively soft rubber, rubber composition, or like resilient or yieldable material. In order to insure efficient feeding of abrasive particles between the runner and glass surface, the runner is rotated in such direction that the frictionally engaging runner and glass surfaces travel in the same direction, as indicated by the arrows (Fig. 6). However, the runner is rotated at much greater peripheral speed than the linear speed of the glass. Therefore, the horizontally moving glass carries the abrasive particles beneath the runner and the rotation of the latter assists in pulling them frictionally between the relatively moving surfaces.

It is to be understood that the rubber face of the yieldable runners are to be supplied with sand or loose abrasive of larger particle size, for example, sand of the type which is employed at the beginning of the surfacing operation under the metal grinders is to be used. Such sand has an average particle size of approximately 30 mesh although the size may be varied considerably from this value. It has been found that two units of runners having the rubber faces of the type described can take the place of four to six of the polishing units without reducing the fineness of the finished glass, and in fact the final surface texture of the glass is more perfectly polished.

It should be understood that magnified cross sections of the glass, or so called profilograms, exhibit high and low points, and that the surfacing of the glass with wet sand under the rubber runners materially reduces the high points or projections without materially deepening the indentations or extending the low points. The lesser the depth of the indentations, of course, the finer and planer the surface can be polished.

Although limited practical forms of the invention have been shown and described in detail, it will be apparent to those skilled in the art that the invention is not so limited, but that various changes can be made therein without departing from the spirit of the invention or from the scope of the appended claims.

We claim:

1. A glass grinding runner having a glass-engaging surfacing area of yieldable and pliant rubber composition softer than the body of the runner, said surfacing area having a hydrocarbon softening agent incorporated therein, means for rotating the runner with its surfacing area in frictional engagement with the glass surface, and means for feeding wet abrasive particles between the surfacing area of the runner and the frictionally engaged glass surface.

2. A glass grinding runner including a metal backing, a series of surfacing elements having enlarged heads of fiber and rubber composition abutting against the metal backing, a plate having openings receiving the elements therethrough in projecting relation, and means for clamping the enlarged heads between the plate and backing.

3. A glass grinding runner including a metal backing, a series of surfacing elements including shanks of rubber composition and enlarged heads of rubber and fiber composition, a plate provided with openings receiving said shanks projecting therethrough and extending therefrom to provide surfacing areas, and means for clamping said enlarged heads between the plate and backing.

4. A grinding runner for surfacing glass comprising a metal backing, a series of yieldable surfacing elements having disc heads and integral depending shanks, a plate having openings receiving the shanks therethrough to provide extended surfacing areas, and means for clamping the heads under compression between the plate and backing.

5. In a method of surfacing plate glass, the steps which comprise subjecting the glass in successive stages to frictional action of wet abrasive particles decreasing in size from approximately 30 mesh to 320-to-700 mesh in the successive stages and under grinding pressure of metal runners, subsequently subjecting said surface to frictional action of wet abrasive particles of approximately 30 mesh rubbed against the glass by a tool having a rubbing surface of pliable rubber composition, and then polishing the glass surface.

MANSON L. DEVOL.
PHILIP W CRIST.
ETHMER J. HAZEN.